| United States Patent [19] | [11] Patent Number: 4,734,391 |
|---|---|
| Schneider et al. | [45] Date of Patent: Mar. 29, 1988 |

[54] CATALYST FOR DECREASING THE CONTENT OF NITROGEN OXIDES IN FLUE GASES

[75] Inventors: Michael Schneider, Ottobrunn-Riemerling; Hans J. Wernicke, Geretsried; Karl Kochloefl; Gerd Maletz, both of Bruckmühl/Heufeld, all of Fed. Rep. of Germany

[73] Assignee: Sud-Chemie Aktiengesellschaft, Munich, Fed. Rep. of Germany

[21] Appl. No.: 895,559

[22] Filed: Aug. 11, 1986

[51] Int. Cl.$^4$ .............................................. B01J 20/16
[52] U.S. Cl. ...................................................... 502/84
[58] Field of Search ..................... 502/83, 84; 423/239

[56] References Cited

FOREIGN PATENT DOCUMENTS

| 2748471 | 6/1973 | Fed. Rep. of Germany . | |
|---|---|---|---|
| 2458888 | 6/1975 | Fed. Rep. of Germany . | |
| 2410175 | 9/1975 | Fed. Rep. of Germany . | |
| 3438367 | 5/1985 | Fed. Rep. of Germany . | |
| 2371961 | 7/1978 | France | 502/84 |
| 93193 | 8/1978 | Japan | 502/84 |

*Primary Examiner*—Carl F. Dees
*Attorney, Agent, or Firm*—Sprung Horn Kramer & Woods

[57] ABSTRACT

A catalyst for decreasing the content of nitrogen oxides in flue gases. The catalyst contains at least one of the metals titanium, zirconium, vanadium, tungsten, molybdenum, or cerium in the form of one or more of their oxides combined with a silicate with a three-layer structure (three-layer silicate) selected from the group consisting of illite and mica. The atomic ratio of the silicon in the three-layer silicate to the metal in the oxide is from 0.2 and 50 and preferably from 0.4 to 25.

10 Claims, No Drawings

CATALYST FOR DECREASING THE CONTENT OF NITROGEN OXIDES IN FLUE GASES

BACKGROUND OF THE INVENTION

1. Field of the Invention

The invention concerns a catalyst for decreasing the content of nitrogen oxides in flue gases.

2. Background Information

Nitrogen oxides ($NO_x$) are generated both from the nitrogenous constituents of the fuel and from the nitrogen in the air when fossil fuels are burned. The oxides enter the atmosphere and become extremely detrimental to the environment.

It is known that nitrogen oxides can be converted into $N_2$ and $H_2O$ by $NH_3$ and that the reaction is fairly selective over a wide range of temperatures, meaning that, since it proceeds in the presence of a high excess of oxygen (as is usual in flue gases) without excessive loss of ammonia as the result of oxidation, only relatively small amounts of reductants are necessary. Various catalysts for reducing $NO_x$ with ammonia are also known.

German AS No. 2 410 175, for example, discloses catalysts of this type that consist of oxides of vanadium molybdenum, and/or tungsten. the stoichiometry is $V_{12-x-y}Mo_xW_y$, wherein $0 \leq x \leq 8.0 \leq y \leq 5$ and $0.3 \leq (x+y) \leq 8$.

Furthermore, German Patent No. 2 458 888 discloses a method of reductively decomposing nitrogen oxides in flue gases. A mixture of gases containing nitrogen oxides, molecular oxygen, and ammonia is contacted with a catalyst composition that contains (A) titanium in the form of oxides in an intimate mixture with (B) iron or vanadium in the form of oxides as its essential constituents.

The drawback to these catalysts is that the catalytically active constituents that they contain in the form of relatively expensive transition metals are exploited only to a low degree because they are not optimally distributed. Although the active constituents are extended by solid inert carriers, which does make them more economical, the dilution with inert material entails the risk of extensively decreasing their catalytic activity. Another drawback to these catalysts is that they also catalyze the $SO_2$ that is often contained in the flue gas into $SO_3$, which can lead for example to deposits of salts in the downstream equipment of the system.

German OS No. 3 438 367 also discloses a catalyst for decreasing the content of nitrogen oxide in flue gases by selective reduction. The catalyst consists of (A) 80 to 95% by weight of a catalytic oxide containing a sulfur oxide and is obtainable among other methods by heat treating an aqueous oxide compound of titanium or silicon, (B) 0 to 5% by weight of a catalytic oxide that contains vanadium oxide, and (C) 1 to 15% by weight of a catalytic oxide like tungsten oxide.

Considered essential to this catalyst is the formation of a solid acid composed of $SiO_2$ and $TiO_2$, its acidity modified by treatment with sulfuric acid or ammonium sulfate. The distribution of the solid acid is considered as representing the standard for controlling the adsorption of $NH_3$ at the surface of the catalyst and hence for improving its catalytic activity.

The $SiO_2$ is employed in the form of a silica sol. It is known that silica gels distinguished both by high BET surfaces and by high porosity can be obtained from $SiO_2$ sols, although the percentage of macropores is low, which has a deleterious effect on material transport and hence on catalytic activity.

German OS No. 2 748 471, finally, discloses a catalyst composition to be employed in the vapor-phase reduction of nitrogen oxides with ammonia, especially to reduce the content of nitrogen oxides in flue gases. This catalyst consists essentially of an oxide or sulfate of one of the metals copper, vanadium, chromium, molybdenum, tungsten, manganese, iron, or cerium on a shaped carrier that contains titanium oxide and a minor portion of a clay mineral with a mean particle size of 0.1 to 100 μm. Clay minerals, inter alia, of the three-layer type (three-layer silicates), can be employed. Up to 15% by weight of these clay minerals is claimed to increase only the stability of the catalyst. The additives have no significant effect on catalytic activity at these levels and larger amounts even have a negative effect in this respect. Due to their chemical composition, they also decrease the catalyst's resistance to flue gases that contain $SO_x$.

SUMMARY OF THE INVENTION

It has been discovered that illite or mica that interact synergistically with other catalytic constituents can be employed to obtain catalysts of the aforesaid genus with improved activity. The latter catalysts can be employed in turn to extensively decrease the content of nitrogen oxide in flue gases, while simultaneously exploiting the expensive oxidic constituents of the catalyst and the reductants. In spite of their relatively high alkali metal content these catalysts have a high resistance to $SO_x$. Illite and mica belong to the three-layer silicates.

The object of the invention is accordingly to provide a catalyst for decreasing the content of nitrogen oxides in flue gases and containing at least one of the metals titanium, zirconium, vanadium, tungsten, molybdenum, or cerium in the form of one or more of their oxides combined with a silicate with a three-layer structure (three-layer silicate).

The catalyst is characterized in that (a) the three-layer silicate is or comprises a member of the group consisting of illite and mica.

(b) the atomic ratio of the silicon in the acid-activated three-layer silicate to the metal(s) in the oxide(s) is from 0.2 and 50 and preferably from 0.4 to 25.

DETAILED DESCRIPTION OF THE INVENTION

Although the illite or mica are not specially treated, there is obviously a synergistic interaction with the metal oxides. Although no unambiguous mechanistic explanation of this synergism can be provided at the present, the particularly favorable silicate layer structure of the illite or mica would seem to be a prerequisite.

The catalysts in accordance with the invention are also outstanding in their resistance to sulfur oxides and sulfuric acid although the alkali metal content is not reduced by an acid treatment of the illite or mica.

The starting compounds employed for the metal-oxide constituents of the catalyst in accordance with the invention are on the one hand the corresponding metal oxides and on the other the substances that can be converted into the metal oxides, e.g. the metals and hydroxides and especially salts, complex compounds, and/or oxygen acids or salts derived from the last. They can be employed if necessary in conjunction with an additive that functions as a reductant and/or complexing agent.

Cerium can for example be employed in the form of $Ce_2O_3$, $CeO_2$, $Ce(SO_4)_2$, and $Ce_2(C_2O_4)_3$. Appropriate starting materials for zirconium oxide are, in addition to the oxide hydrates, for example, the zirconium and zirconyl salts like $Zr(SO_4)_2$, $ZrCl_4$, $ZrOCl_2$, and $Zr(C_2O_4)_2$.

Appropriate starting substances for the tungsten constitutents are, for example, tungsten oxides like $WO_3$, $W_{10}O_{29}$, $W_4O_{11}$, and $WO_2$ and mono- and polytungstic acids, heteropolyacids, tungstates, and tungstic halides and oxyhalides. Molybdenum compounds can also be employed instead of the analogous tungsten compounds.

Appropriate vanadium starting compounds include $V_2O_5$, $VO_2$, $V_2O_3$, and $VO$ along with ortho- and polyvanadic acids or vanadates, vanadium halides and oxyhalides like $VOCl_3$, for example, and various vanadium or vanadyl salts.

Appropriate titanium compounds are, in addition to the oxides and oxide hydrates, the titanium and titanyl salts, expecially the halides and sulfates. Although titanyl sulfate is preferable from the economic point of view, metal-organic compounds like titanates, isopropyl titanate for example, can also be employed.

It has been discovered that expecially practical results can be achieved when the metal oxides are individually present in the following ranges of concentration (by weight):

$TiO_2 = 10-80$ Gew.-%

$WO_3$ and/or $MoO_3 = 1-25$ Gew.-%

$V_2O_5 = 0,1-25$ Gew.-%

$CeO_2 = 1-25$ Gew.-% with the illite or mica accounting for the rest of the active constituents.

The metal oxides are present in the preferred catalysts in a binary, especially ternary combination.

When present in a ternary combination, the metal oxides are present in a preferred catalyst in one of the following percentages by weight:

(a) $(TiO_2 + WO_3$ and/or $MoO_3 + V_2O_5) = 10-80$ (b) $(TiO_2 + CeO_2 + V_2O_5) = 10-80$ (c) $(TiO_2 + ZrO_2 + V_2O_5) = 10-80$ (d) $(WO_3$ and/or $MoO_3 + CeO_2 + V_2O_5) = 10-25$ (e) $(WO_3$ and/or $MoO_3 + ZrO_2 + V_2O_5) = 10-25$ with the illite or mica accounting for the rest of the active constituents.

The ratios between the weights of the metal oxides present in a ternary combination in a preferred catalyst are as follows:

(a) $WO_3$ and/or $MoO_3:TiO_2 = 0.01-0.25$ $V_2O_5:TiO_2 = 0.01-0.11$ (b) $CeO_2:TiO_2 = 0.05-0.23$ $V_2O_5:TiO_2 = 0.01-0.11$ (c) $ZrO_2:TiO_2 = 0.01-0.24$ $V_2O_5:TiO_2 = 0.01-0.11$ (d) $CeO_2:WO_3$ and/or $MoO_3 = 0.1-5.0$ $V_2O_5:WO_3$ and/or $MoO_3 = 0.1-2.5$ (e) $V_2O_5:WO_3$ and/or $MoO_3 = 0.1-2.5$ $ZrO_2:WO_3$ and/or $MoO_3 = 0.1-10$ The catalysts in accordance with the invention can be obtained, for example, by impregnating the illite or mica with a solution containing one or more of the aforesaid metals in the form of salts and/or complex compounds and calcining it.

In another variant, the catalyst can be obtained by mechanically mixing the illite or mica with an oxide or salt of one or more of the aforesaid metals (by grinding in a ball mill for example), impregnating the mixture, if necessary, with a solution containing one or more of the aforesaid metals in the form of salts and/or complex compounds, and calcining it.

The catalysts in accordance with the invention can also be obtained by precipitating or reprecipitating at least one compound containing one or more of the aforesaid metals in the presence of a suspension of the illite or mica, washing out the foreign ions, and calcining.

The compound or compounds containing one or more of the aforesaid metals can also be precipitated or reprecipitated in the presence of a mixture of suspensions of the illite or mica and of an oxide or salt of one or more of the aforesaid metals. This stage is followed by washing out the foreign ions and calcining.

The result of these procedures is an almost optimally intimate mixture of the oxidic metal constituents with the illite or mica.

If the oxidic metal constituents consist of several metal oxides, the particular starting compounds can either be precipitated together or one after another in several stages, with the sequence of precipitation stages generally affecting the catalytic activity and needing to be optimized individually. It can of course turn out to be practical to impregnate the illite or mica, subsequent to one or more precipitaton stages, if necesssary, with a solution of a corresponding transition compound. Impregation can occur either before or after shaping and calcining the catalyst.

The catalyst in accordance with the invention can also contain an inert carrier. The catalyst is usually present in the from of molded shapes, expecially balls, tablets, extruded shapes, oblong or flat honeycombs, (called "channel grids") plates, rods, tubes, rings, wagon wheels, or saddles.

The shapes can be obtained for example by tableting or extruding the catalyst composition, with additives also mixed in, if necessary, to facilitate shaping. Such additives include, for example, graphite and aluminum stearate. Additives to improve the surface structure can also be mixed in. These include, for example, organic substances that will burn up and leave a porous structure during the subsequent calcination.

It is not absolutely necessary to employ additives to facilitate shaping because the starting material is plastically deformable even when intimately mixed with the metal constituents. Neutral bentonites or other binders like kaolin or cement can, however, also be added. The material is generally shaped with water or organic solvents like monovalent or polyvalent alcohols added.

The catalysts in accordance with the invention are usually dried after being shaped, and calcined at temperatures of 200° C. to 700° C. and preferably 300° C. to 550° C. Inorganic fibrous materials can also be added before shaping to improve strength. Calcination activates the catalyst, which accordingly obtains its practical properties, expecially if the aforesaid temperature ranges are maintained.

The examples hereinbelow specify typical procedures for manufacturing the catalysts in accordance with the invention.

Another object of the invention is the use of the catalysts in accordance with the invention for reductively decreasing the content of nitrogen oxide in flue gases that contain, in addition to the usual constituents, sulfur oxides ($SO_x$), whereby $NH_3$ is employed as a reductant.

In reducing with $NH_3$, the content of nitrogen oxides in the flue gases is decreased due to the formation of $N_2$ and $H_2O$. Although nitrogen oxides ($NO_x$) are any compound of nitrogen and oxygen like $NO$, $N_2O_3$, $NO_2$, and $N_2O_5$, the most important in the present context are $NO$ and $NO_2$, mainly the former.

The concentration of $NO_x$ in the flue gases that are to be cleaned can vary widely, generally ranging from 100 ppm by volume to 5% by volume. The molar ratio of $NH_3$ to $NO_x$ is generally 0.3 to 3, preferably 0.6 to 1.5, and can be regulated by controls technology to obtain maximum $NO_x$ conversion at the minimum possible $NH_3$ slippage. The $NH_3$ can be added either in the form of a gas or in aqueous solution.

The catalysts in accordance with the invention are distinguished beyond known catalysts by a very extensively selective conversion of the ammonia that is preferred for reducing the nitrogen oxides. In conventional methods, expecially at high operating temperatures, a considerable amount of the ammonia does not get consumed during the desired $NO_x$ removal, but oxidizes due to the oxygen present in the flue gas. This leads to additional nitrogen formation or decreases the conversion of $NO_x$ observed between the entrance into and exit from the reactor, leading to unnecessary consumption of $NH_3$.

Any of the reactors employed for heterogeneous catalyzed gas-phase reactions are appropriate for the $NO_x$ reduction if their design allows high volumetric flue-gas currents in relation to output. Permissible space velocities are in the range of 500 to 20,000 and preferably 1000 and 15,000 liters of gas per hour and liters of catalyst in terms of a gas to 0° C. and 1 bar. Space velocity will be designated as the dimension $h^{-1}$ in what follows for the sake of simplicity. Appropriate reaction temperatures range from approximately 200° C. to 600° C. and preferably 250° to 430° C. If the temperatures are much higher the ammonia can be oxidized by the oxygen in the flue gas, removing the ammonia from the reaction along with the nitrogen oxides and allowing the degree of $NO_x$ reduction to drop. This undesirable effect, however, is not as powerful with the catalysts in accordance with the invention as with known catalysts.

Typical examples of the manufacture and use of the catalysts in accordance with the invention will now be specified.

The effectiveness of the catalysts with respect to eliminating nitrogen oxides from mixtures of gases that contain, among other substances, oxygen and sulfur oxides is determined by contacting the catalyst with a stream of gas flowing through a tube packed with the catalyst and electrically heated from outside. The mixture of gases is composed of:

$O_2$—3% by volume
$H_2O$—10% by volume
$NO$—750 ppm by volume
$NO_2$—50 ppm by volume
$NH_3$—800 ppm by volume
$SO_2$—950 ppm by volume
$SO_3$—50 ppm by volume and
$N_2$— to make up 100% by volume.

The concentration of $NO_x$ in the mixture was measured before and after it traveled through the catalyst packing by an appropriated analyzer (chemoluminescence). The level of $NO_x$ converted subsequent to establishment of a stationary state and as defined by the equation $$NO_x \text{ conversion } (C_{NO_x}) = \frac{c_{NO_x}^E - c_{NO_x}^A}{c_{NO_x}^E} \cdot 100(\%)$$

was selected as the measure for the effectiveness of the catalysts in reducing the nitrogen oxides. $c_{NO_x}$ represents the concentrations of $NO$ and $NO_2$, and the superscripts E and A the state of the mixture of gases before and after traveling through the catalyst.

EXAMPLE 1

(a) 180 g titanyl sulfate ($TiOSO_4$) is stirred into a suspension of 400 g dioctahedral illite having a BET surface area of 41 $m^2/g$ and the chemical composition listed in Table I. The batch is neutralized with ammonia. The solids are suctioned-off, washed free of sulfates, dried for 15 hours at 120° C., and kneaded into a solution of 10.5 g of ammonium metatungstate in water and into a solution obtained by reducing 1.3 g ammonium metavanadate with a 1.6-fold excess of oxalic-acid dihydrate. The amounts of solvents were selected to ensure easy-to-knead pastes. The dried composition is pressed into shaped bodies which are calcined at 500° C. for 5 hours.

EXAMPLE 2

400 g potassium mica (muscovite) are reduced to an average particle size of 40 μm by grinding. The chemical composition is listed in Table I.

The finely divided mica is impregnated with titanyl sulfate ammonium metatungstate and ammonium metavanadate. The dried composition is pressed into shaped bodies which are calcined at 500° C. for 5 hours.

The composition of the catalysts, the reaction temperatures and the $NO_x$ conversions at a space velocity of 6400 $h^{-1}$ are listed in Table II. The above-mentioned gas mixture was used for carrying out the reactions; the $NO_x$ conversions were calculated according to the above-mentioned formula.

TABLE I

| Silicate | Composition of the silicates | | | | | | | |
|---|---|---|---|---|---|---|---|---|
| | $SiO_2$ (%) | $Al_2O_3$ (%) | $Fe_2O_3$ (%) | CaO (%) | MgO (%) | $Na_2O$ (%) | $K_2O$ (%) | Ignition loss (%) |
| Illite (Example 1) | 56.0 | 17.0 | 9.2 | 0.3 | 3.3 | 0.1 | 6.7 | 6.4 |
| Mica (Example 2) | 49.1 | 28.9 | 3.8 | 0.1 | 1.4 | 1.7 | 9.3 | 4.1 |

TABLE II

| | | Composition of the catalysts and $NO_x$ conversions | | | | | | |
|---|---|---|---|---|---|---|---|---|
| | | $V_2O_5$ | $WO_3$ | $TiO_2$ | $NO_x$ conversion (%) | | | |
| Example | Silicate constituent | (%) | (%) | (%) | (%) | 250° C. | 300° C. | 350° C. | 400° C. |
| 1 | Illite | 80 | 0.2 | 1.8 | 18 | not detd. | 67 | 63 | 43 |
| 2 | Mica | 80 | 0.2 | 1.8 | 18 | 89 | 91 | 89 | 79 |

What is claimed is:

1. A catalyst for decreasing the content of nitrogen oxides in flue gases comprising at least one metal selected from the group consisting of titanium, zirconium, vanadium, tungsten, molybdenum and cerium in the form of one or more of their oxides and a silicate with a three-layer structure selected from the group consisting of illite and mica, the atomic ratio of the silicon in the three-layer silicate to the metal in the oxide being between 0.2 and 50.

2. A catalyst according to claim 1, wherein the atomic ratio of the silicon in the three-layer silicate to the metal in the oxide is from 0.4 to 25.

3. A catalyst according to claim 1, wherein the metal oxides are individually present in the following ranges of concentration:
$TiO_2$:10–80% by weight,
$WO_3$ and/or $MoO_3$:1–25% by weight,
$V_2O_5$:0.1–25% by weight, and
$CeO_2$:1–25% by weight,
with the illite or mica accounting for the rest of the active constituents.

4. A catalyst according to claim 1, wherein when present in a ternary combination, the metal oxides are present in one of the following percentages by weight:

(a) $(TiO_2+WO_3+\text{and/or }MoO_3+V_2O_5)=10-80$ (b) $(TiO_2+CeO_2+V_2O_5)=10-80$ (c) $(TiO_2+ZrO_2+V_2O_5)=10-80$ (d) $(WO_3 \text{ and/or } MoO_3+CeO_2+V_2O_5)=10-25$ (e) $(WO_3 \text{ and/or } MoO_3+ZrO_2+V_2O_5)=10-25$ with the illite or mica accounting for the rest of the active constituents.

5. A catalyst according to claim 4, wherein the ratios between the weights of the metal oxides present in the ternary combination are (a) $WO_3$ and/or $MoO_3$:$TiO_2=0.01-0.25$ $V_2O_5$:$TiO_2=0.01-0.11$ (b) $CeO_2$:$TiO_2=0.05-0.23$ $V_2O_5$:$TiO_2=0.01-0.11$ (c) $ZrO_2$:$TiO_2=0.01-0.24$ $V_2O_5$:$TiO_2=0.01-0.11$ (d) $CeO_2$:$WO_3$ and/or $MoO_3=0.1-5.0$ $V_2O_5$:$WO_3=0.1-2.5$ and (e) $V_2O_5$:$WO_3$ and/or $MoO_3=0.1-2.5$ $ZrO_2$:$WO_3=0.1-10$ 6. A catalyst according to claim 1, wherein the catalyst is in the form of shaped bodies, oblong or flat honeycomb, plates, rods, tubes, rings, wagon wheels or saddles.

7. A catalyst according to claim 1, wherein the catalyst is produced by impregnating the illite or mica with a solution containing one or more of the metals in the form of salts and/or complex compounds and conducting calcination.

8. A catalyst according to claim 1, wherein the catalyst is produced by mechanically mixing the illite or mica with an oxide or salt of one or more of the metals, impregnating the resultant mixture with a solution containing one or more of the metals in the form of salts and/or complex compounds, and conducting calcination.

9. A catalyst according to claim 1, wherein the catalyst is produced by precipitating or reprecipitating at least one compound containing one or more of the metals in the presence of a suspension of the illite or mica, washing out the foreign ions, and calcining.

10. A catalyst according to claim 1, wherein the catalyst is produced by precipitating or reprecipitating at least one compound containing one or more of the metals in the presence of a mixture of suspensions of the illite or mica and of an oxide or salt of one or more of the metals, washing out the foreign ions, and calcining.

* * * * *